(12) United States Patent
Yamada

(10) Patent No.: US 6,559,634 B2
(45) Date of Patent: May 6, 2003

(54) VEHICLE WHEEL ROTATION DETECTING SYSTEM AND METHOD

(75) Inventor: Noritaka Yamada, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/956,957

(22) Filed: Sep. 21, 2001

(65) Prior Publication Data

US 2002/0041182 A1 Apr. 11, 2002

(30) Foreign Application Priority Data

Sep. 29, 2000 (JP) ........................ 2000-300190

(51) Int. Cl.⁷ .............................. G01P 3/48; G01P 13/04
(52) U.S. Cl. ..................... 324/174; 324/161; 324/173; 701/70
(58) Field of Search ................... 324/161, 173, 324/174, 207.25, 207.21, 166; 303/92; 188/181; 701/29, 70

(56) References Cited

U.S. PATENT DOCUMENTS

| | | | | |
|---|---|---|---|---|
| 4,629,982 A | * | 12/1986 | Kieslich | 324/207.23 |
| 4,669,046 A | * | 5/1987 | Kubo | 303/122.07 |
| 4,836,616 A | * | 6/1989 | Roper et al. | 188/181 C |
| 4,931,727 A | * | 6/1990 | Yamanoue et al. | 188/181 R |
| 5,251,968 A | * | 10/1993 | Rath | 188/349 |
| 5,775,783 A | * | 7/1998 | Byon | 303/122 |
| 6,242,904 B1 | * | 6/2001 | Shirai et al. | 324/165 |
| 2001/0002791 A1 | * | 6/2001 | Tsuge et al. | 324/174 |
| 2002/0040268 A1 | * | 4/2002 | Yamada et al. | 701/74 |

FOREIGN PATENT DOCUMENTS

| JP | A 2000-187039 | | 7/2000 | .......... G01P/13/04 |
|---|---|---|---|---|
| JP | 2001-165951 | * | 6/2001 | .......... G01P/13/00 |

* cited by examiner

Primary Examiner—Edward Lefkowitz
Assistant Examiner—Darrell Kinder
(74) Attorney, Agent, or Firm—Oliff & Berridge, PLC

(57) ABSTRACT

In a vehicle wheel rotation detecting system, a signal input portion of an ECU accurately detects a vehicle wheel speed and a rotating direction of the vehicle wheel speed of the respective wheels. On the basis of the detected results, the respective computers are operated to perform ABS control, TC control and VSC control. When a computing result of the vehicle wheel speed is equal to or greater than a predetermined value, a change in the rotating direction is inhibited. This may prevent an error in the result of detection of the wheel rotating direction owing to an external magnetic filed and the like so as to further optimize the vehicle state control.

9 Claims, 6 Drawing Sheets

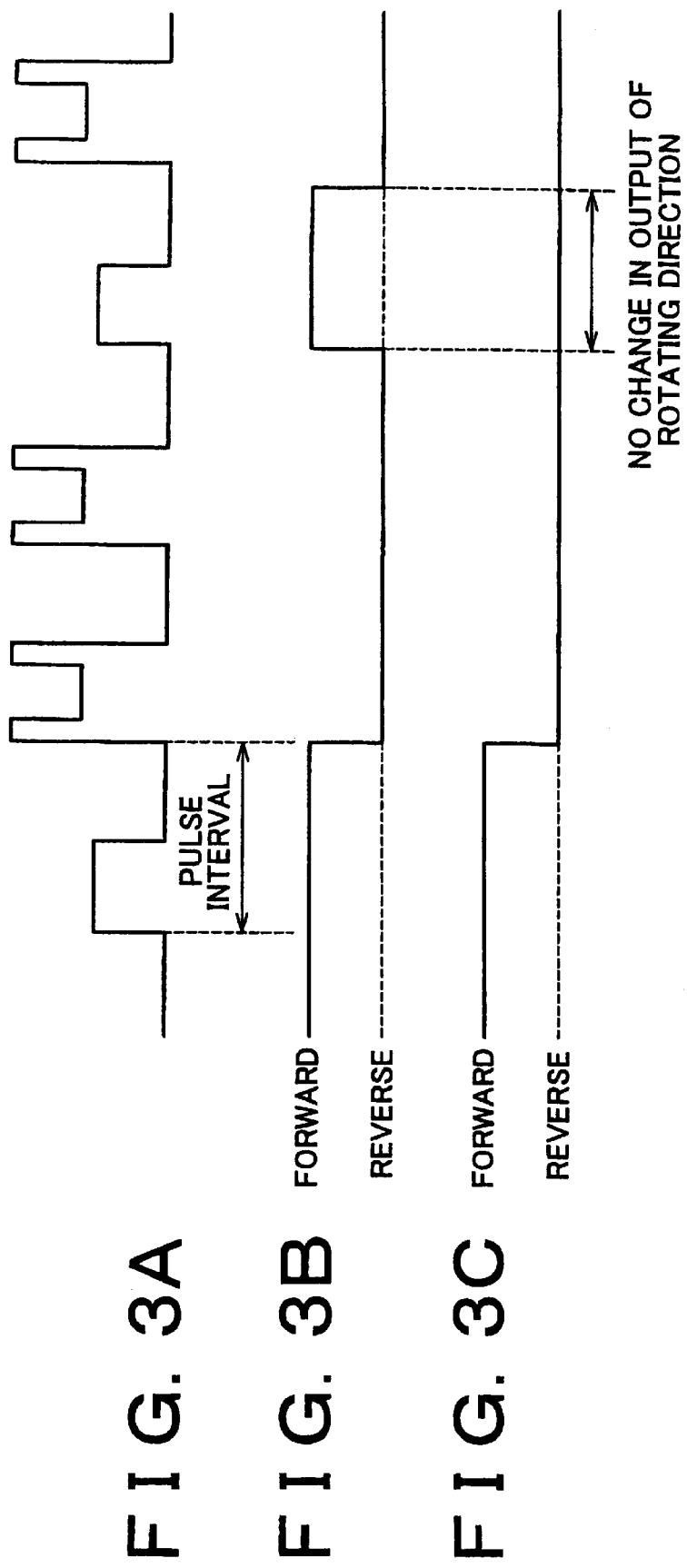

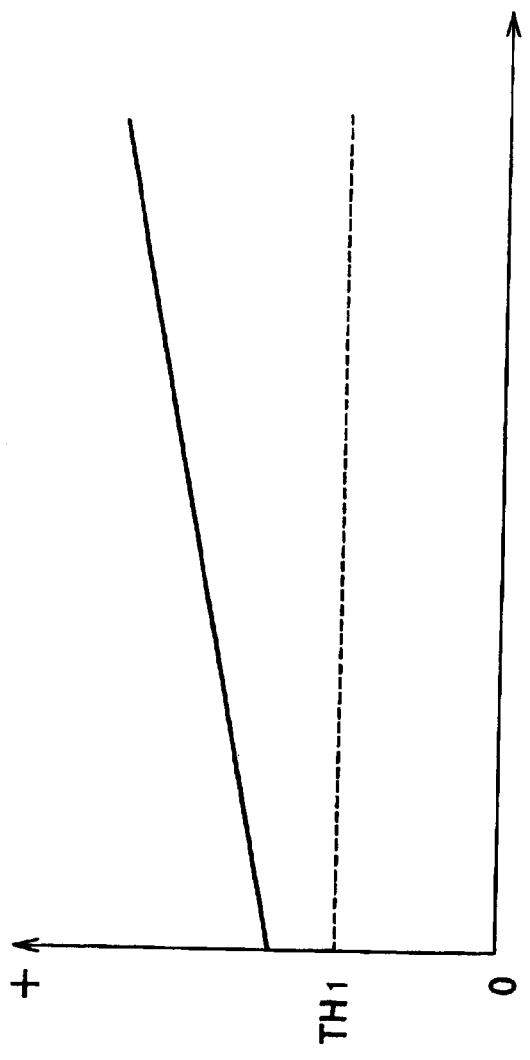
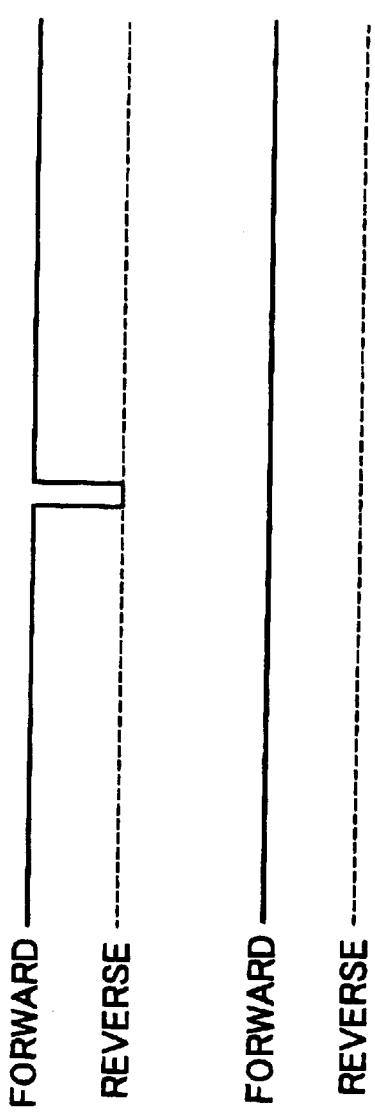
FIG. 5A
FIG. 5B
FIG. 5C

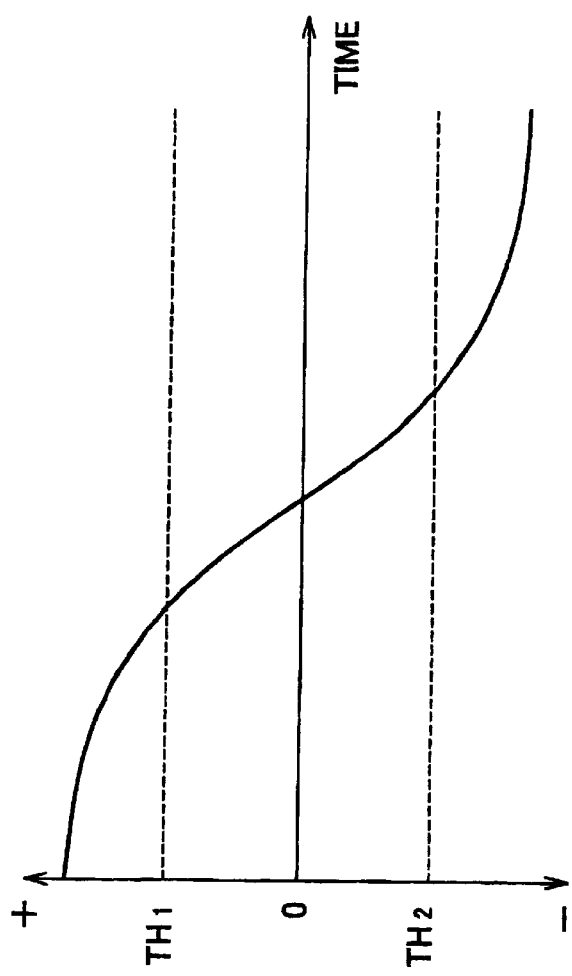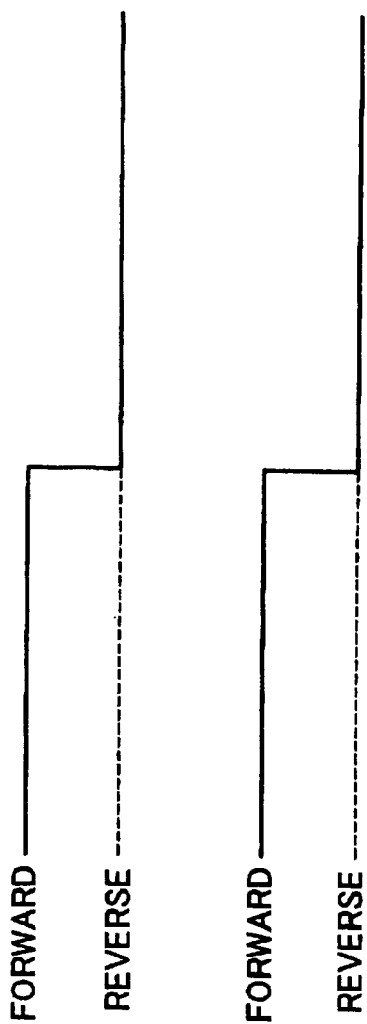
FIG. 6A
FIG. 6B
FIG. 6C

VEHICLE WHEEL ROTATION DETECTING SYSTEM AND METHOD

INCORPORATION BY REFERENCE

The disclosure of Japanese Patent Application No. 2000-300190 filed on Sep. 29, 2000 including the specification, drawings and abstract is incorporated herein by reference in its entirety.

BACKGROUND OF THE INVENTION

1. Field of Invention

The invention relates to a vehicle wheel rotation detecting system, which is incorporated in the vehicle.

2. Description of Related Art

JP-A-2000-187039 discloses a system for detecting a rotating direction of a rotating object, such as a vehicle wheel, in accordance with a state of phase of an output detected by a pair of sensors mounted to the respective rotating objects.

When employing the aforementioned system for detecting the rotating state of the rotating object, the resultant output of the rotating direction may possibly be incorrect and different from an actual rotating direction owing to the influence of an external magnetic field or a magnetic environment. The incorrect output as described above is undesirable in view of an optimal operation of an on-board device including an anti-lock braking system (hereinafter referred to as an ABS), or the like.

SUMMARY OF THE INVENTION

It is an object of the invention to provide a system which detects a rotating state of a vehicle wheel so as to avoid an output of incorrect rotating direction.

A vehicle wheel rotation detecting system is provided with a rotating member which rotates together with a vehicle wheel, a detected portion, which is provided in the rotating member, a detector which generates a signal in response to a passage of the detected portion, and a rotating direction detector which detects a rotating direction of the vehicle wheel in accordance with an output of the detector, the rotating direction being adapted to be used by an on-board system. In this system, when a rotating speed of the vehicle wheel is equal to or greater than a predetermined value, a change in an output of the rotating direction is inhibited.

If the rotating speed of the wheel is equal to or greater than a predetermined value, the vehicle wheel rotation detecting system is operative to inhibit the change of an output of the rotating direction. As a result, an output of the incorrect rotating direction may be prevented. It is conceivable that the rotating direction cannot be turned in an abrupt way because of an inertial force. Accordingly, in the state in which the rotating speed of the wheel is equal to or greater than the predetermined value, detection of incorrect rotating direction may be easily prevented by the control to inhibit the change of the output of the rotating direction.

BRIEF DESCRIPTION OF THE DRAWINGS

The invention will be described with reference to the following drawings in which like reference numerals refer to like elements and wherein:

FIG. 3A is a timing chart that shows a specific output of a magnetic sensor unit;

FIG. 3B shows a result of detection of a rotating direction of the wheel;

FIG. 3C is a result of modification of the rotating direction of the wheel;

FIGS. 5A to C are timing charts each illustrating an example of a signal processing executed in the signal input portion; and FIGS. 6A to C are timing charts each illustrating another example of a signal processing executed in the signal input portion.

DETAILED DESCRIPTION OF PREFERRED EMBODIMENTS

A vehicle wheel rotation detecting system according to an embodiment of the invention will be described referring to FIGS. 1 to 6.

Figure 1:
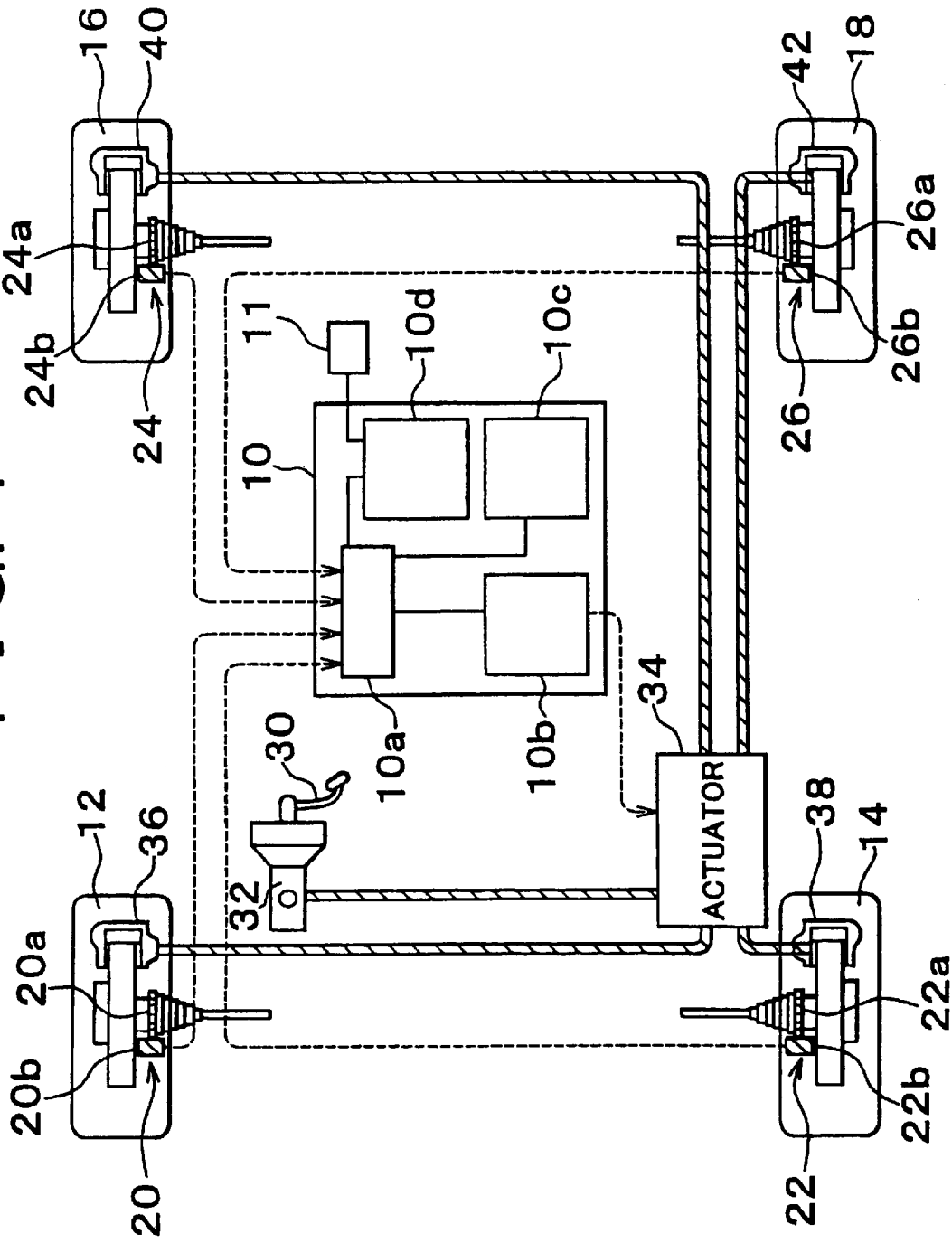
FIG. 1 is a view schematically showing a construction of a vehicle that incorporates a rotating state detecting system of an embodiment according to the invention.

FIG. 1 schematically shows a construction of a vehicle which incorporates a rotation detecting system according to the present embodiment. The vehicle has a front right wheel 12, a front left wheel 14, a rear right wheel 16, and a rear left wheel 18. The wheels 12, 14, 16, 18 are respectively provided with a front right speed sensor 20, a front left speed sensor 22, a rear right speed sensor 24, and a rear left speed sensor 26.

Signals generated by the respective sensors 20, 22, 24 and 26 are sent to an electronic control unit (ECU) 10 that controls an operating state of the vehicle. The ECU 10 includes a signal input portion 10a that outputs pieces of information concerning the rotating speed and the rotating direction upon receipt of the signals from the sensors 20, 22, 24, 26, and an ABS computer 10b that controls braking of the vehicle using the information received from the signal input portion 10a. The signal input portion 10a functions to detect the rotating direction of the vehicle, detect a stop of the vehicle, and restrict an output of detection of the vehicle wheel rotation.

Incorporated in the ECU 10 are a traction control (TC) computer 10c that prevents racing of a driving wheel using the information sent from the signal input portion 10a, and a vehicle stability control (VSC) computer 10d that controls a position/behavior of the vehicle during a turn on the basis of the information sent from the signal input portion 10a and a yaw rate sensor 11.

In the vehicle, a master cylinder 32 is connected to a brake pedal 30 that is depressed by a vehicle operator for braking operation. The master cylinder 32 generates a braking hydraulic pressure in accordance with a displacement of the brake pedal 30. The braking hydraulic pressure generated by the master cylinder 32 is transmitted via an actuator 34 to a front right wheel cylinder 36, a front left wheel cylinder 38, a rear right wheel cylinder 40 and a rear left wheel cylinder 42, which are respectively provided in the wheels 12, 14, 16, 18.

The ABS computer 10b of the ECU 10 outputs a control signal to the actuator 34, and thus controls the hydraulic pressures of the wheel cylinders 36, 38, 40, 42 for the respective wheels 12, 14, 16, 18 so as to perform ABS control upon braking of the vehicle.

The ABS computer 10b includes a CPU that executes programs, a memory such as a RAM and a ROM that stores the programs and data, and an interface through which data are transmitted to and received from the signal input portion 10a, the actuator 34, and the like. The brake pedal 30, the ABS computer 10b, actuator 34, and the wheel cylinders 36, 38, 40, 42 constitute the ABS system as an on-board system.

Each of the speed sensors 20, 22, 24, 26 for the respective wheels 12, 14, 16, 18 includes a rotor 20a, 22a, 24a, 26a in the form of an annular rotating member that rotates with a corresponding one of the wheels 12, 14, 16, 18, and a magnetic sensor unit 20b, 22b, 24b, 26b as a detecting device that outputs a signal in response to passage of a detected portion that is provided in each of the rotors 20a, 22a, 24a, 26a. The detected portion that is formed in the respective rotors 20a, 22a, 24a, and 26a may be in the form of, for example, protrusions made of a magnetic body which are formed along the outer periphery of the corresponding rotor at predetermined intervals.

Each of the magnetic sensor units 20b, 22b, 24b, 26b includes a semiconductor magnetic sensor, for example, a pair of Hall elements or a pair of MR elements, and a signal processing circuit. The magnetic sensor unit detects a subtle change in the magnetic field upon passage of the protrusion, or the like, and forms an appropriate type of signal to be transmitted to the ECU 10.

Figures 2A, 2B:
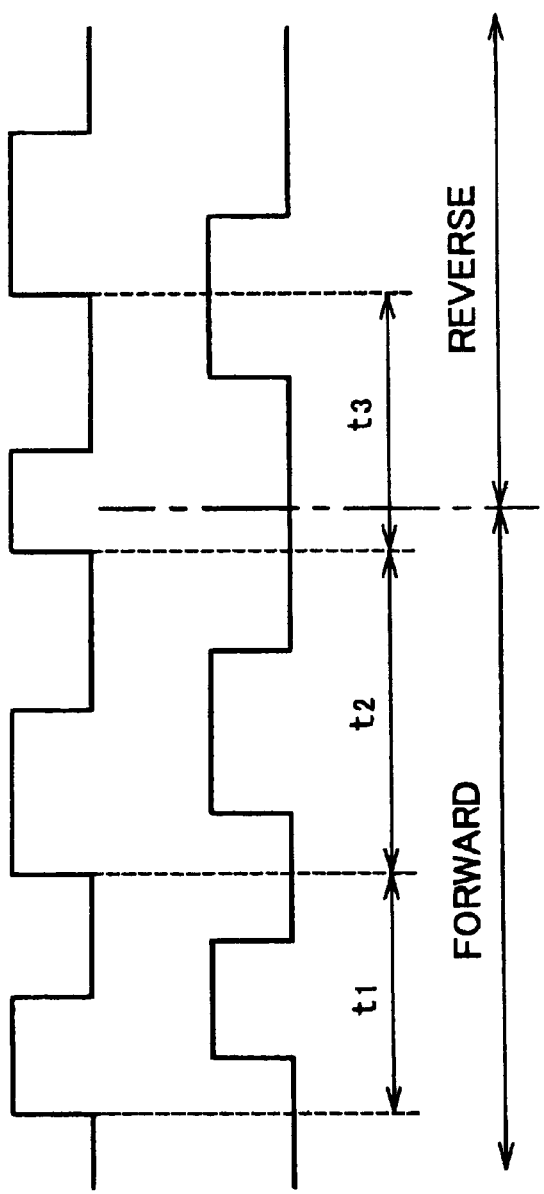
FIGS. 2A and 2B are timing charts each showing a fundamental with respect to detection of a rotating speed and a rotating direction, respectively.

FIGS. 2A and 2B are timing charts which illustrate how the rotating speed and rotating direction of the wheel 12 are detected by the magnetic sensor unit 20b. FIG. 2A illustrates an output signal sent from one element of the magnetic sensor unit 20b, and FIG. 2B illustrates an output signal sent from the other element. The rotating speed of the wheel 12 can be detected by detecting intervals t1, t2, t3 between successive leading edges of pulses of one of the above two signals. The rotating direction of the wheel 12 can be detected based on a difference in the phase of pulses between the two signals.

FIG. 3A illustrates a signal output from the magnetic sensor unit 20b. The interval between the successive leading edges of pulses corresponds to the rotating speed of the wheel 12, and the pulse level corresponds to the rotating direction of the wheel 12. FIG. 3B illustrates a detection result obtained by a conventional system for detecting the rotating direction of the wheel 12. In the present embodiment, when it is determined that the rotating speed of the wheel 12 is equal to or higher than a predetermined speed, the change in the output of the rotating direction detected on the basis of a signal output from the magnetic sensor unit 20b is inhibited. More specifically, when it is determined that the rotating speed of the wheel 12 becomes equal to or greater than a predetermined value in the signal input portion 10a, and the signal input portion 10a determines that there is almost no possibility of a change in the rotating direction of the wheel, the output representing the rotating direction of the wheel 12 is kept unchanged irrespective of the signal output from the magnetic sensor unit 20b. Further specifically, when the rotating speed of the outer periphery of the wheel 12 becomes equal to or higher than 10 km/h, in other words, the pulse interval received from the magnetic sensor unit 20b becomes equal to or greater than 16 ms, the change in the output of the rotating direction is made invalid.

The rotating speed based on which the change in the rotating direction can be made invalid is not limited to 10 km/h as indicated above. It may be set to, for example, 5 km/h or less in consideration of an inertial force of the wheel 12 and the interval between the detected portions mounted on the rotors 20a, 22a, 24a, and 26a.

Figure 4:
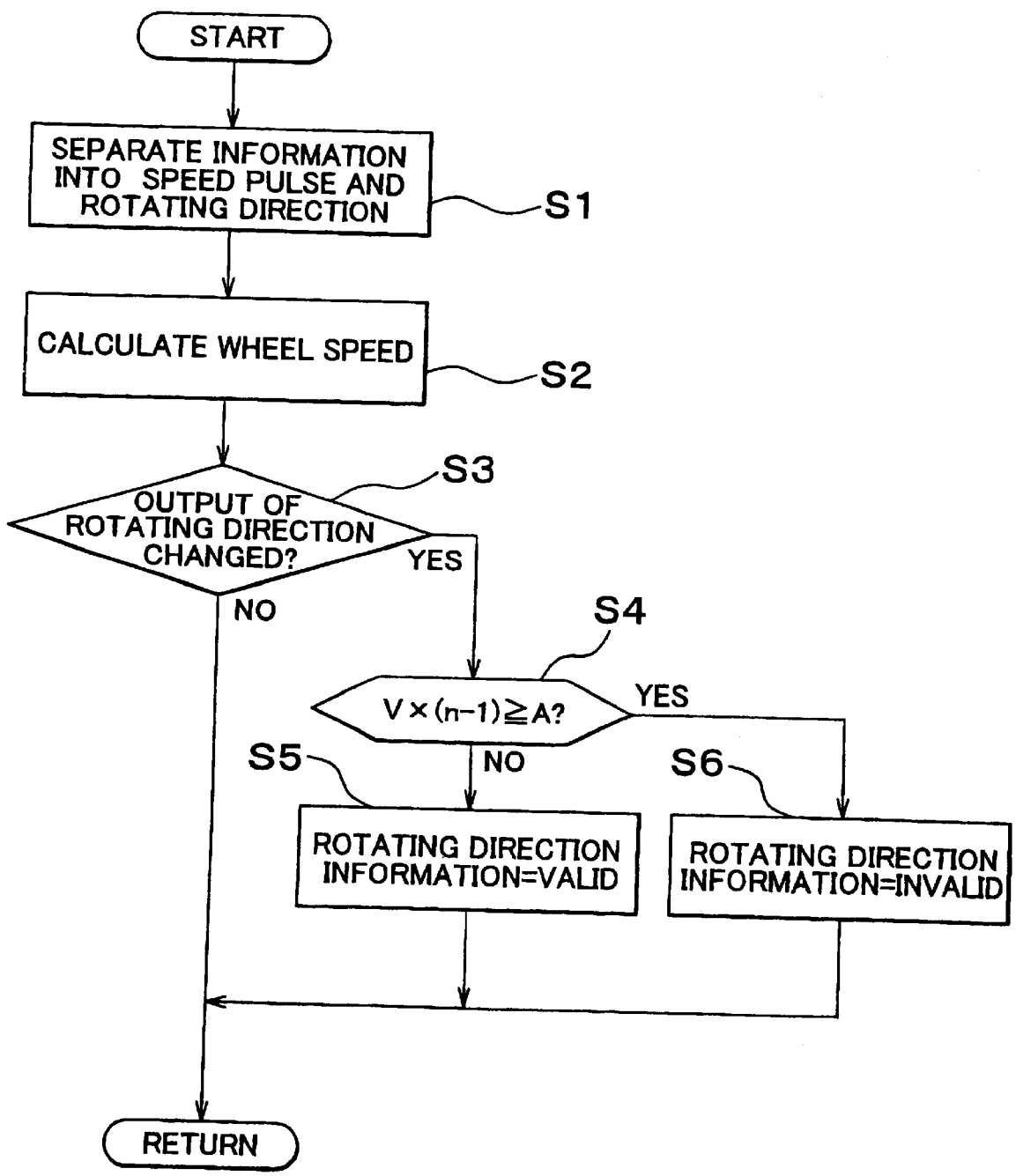
FIG. 4 is a flowchart illustrating a control routine executed by a signal input portion of an ECU.

FIG. 4 is a flowchart illustrating a control routine executed in the signal input portion 10a of the ECU10. In step S1, a signal output from the magnetic sensor unit 20b is separated into pulse information relating to the rotating speed and information relating to the rotating direction. In step S2, the pulse information (in the form of an analog signal) relating to the rotating speed is appropriately processed and is converted into a digital signal so as to calculate the information (computed value of the wheel rotating speed) corresponding to the rotating speed of the wheel 12. In this case, if the rotating speed of the outer periphery of the wheel 12 is equal to or lower than 3 km/h, it is determined that the wheel 12 is in a substantially stopped state. Accordingly the computed value is set to 0. Alternatively, the wheel speed calculated by the ABS computer 10b may be used as the wheel-speed computed value.

In step S3, it is determined whether the information relating to the rotating direction of the wheel 12 is changed. If NO is obtained, that is, it is determined that the information relating to the rotating direction has not been changed, the routine terminates without processing the rotating direction information. Meanwhile, if YES is obtained in step S3, that is, if it is determined that the information relating to the rotating direction has been changed, the process proceeds to step S4. In step S4, it is determined whether the wheel-speed computed value is equal to or greater than a predetermined value, that is, whether the wheel 12 rotates at a relatively high speed. If NO is obtained, that is, the wheel 12 rotates at a relatively low speed, for example, the wheel-speed computed value is less than 10 km/h, the process proceeds to step S5. In step S5, the rotating direction information indicating the change in the rotating direction is determined as being valid.

Meanwhile, If YES is obtained in step S4, that is, the wheel 12 rotates at a relatively high speed, for example, the wheel-speed computed value is equal to or greater than 10 km/h, the process proceeds to step S6. In step S6, the rotating direction information indicating the change in the rotating direction is determined as being invalid, and the rotating direction detected in the last cycle is maintained.

The same control as above is executed with respect to other wheels 14, 16, 18 in accordance with the aforementioned routine on the basis of the output signals from the magnetic sensor units 22b, 24b, and 26b, respectively. In this way, appropriate digital data can be obtained with respect to the rotating speeds and the rotating directions of the wheels 12, 14, 16, 18, respectively. If the result of computing the wheel rotating speed becomes equal to or greater than a predetermined value, the change in the output of the detection result of the rotating direction is inhibited. This may prevent an error in detection result of the rotating direction owing to such factors as an external magnetic field and a magnetic environment.

FIGS. 5A to 5C and FIGS. 6A to 6C are timing charts illustrating specific examples of the signal processing executed by the signal input portion 10a.

FIG. 5A is a timing chart illustrating an example of an actual wheel rotating speed. Dotted lines shown in FIG. 5A indicate a threshold value TH1 in the case of forward rotation of the wheel. FIG. 5B is a timing chart illustrating information of the wheel rotating direction which has been separated from the pulse information of the wheel rotating speed in step S1 executed by the control routine shown in FIG. 4. FIG. 5C is a timing chart illustrating the information of the wheel rotating direction that has been processed in steps S3 to S6 shown in FIG. 4 and output from the signal input portion 10a. The ABS computer 10b or the like is designed to proceed the information as digital data output from the signal input portion 10a.

In this case, since the wheel rotating speed is equal to or greater than the threshold value TH1, the change in the output of the detection result of the rotating direction is inhibited. This may prevent an error in the result of detection of the wheel rotating direction obtained by the wheel rotation detecting device owing to such factors as the external magnetic field and the magnetic environment.

FIG. 6A is a timing chart illustrating another example of the actual wheel rotating speed. Dotted lines shown in FIG. 6A indicate a threshold value TH2 in the case of reverse rotation of the wheel and the threshold value TH1 in the case of forward rotation of the wheel. The absolute value of the threshold value TH1 is the same as that of the threshold value TH2. FIG. 6B is a timing chart illustrating pulse information of the wheel rotating direction which has just been separated from the pulse information of the wheel rotating speed in step S1 executed by the control routine shown in FIG. 4. FIG. 6C is a timing chart illustrating the information of the wheel rotating direction that has been processed in steps S3 to S6 shown in FIG. 4 and output from the signal input portion 10a.

In the above case, the rotation of the wheel has been changed from forward rotation to the reverse rotation. The change in the wheel rotating direction, however, is allowed because the wheel rotating speed is within a range between the threshold values TH1 and TH2, and therefore, no error occurs in the result of detection of the rotation detecting device.

The ABS computer 10b operates in a selected one of four modes, that is, normal braking mode, pressure-decreasing mode, pressure-keeping mode, and pressure-increasing mode, on the basis of pieces of information with respect to the wheel rotating speed and the wheel rotating direction as obtained from the signal input portion 10a. The operation of the ABS computer 10b in the respective operating modes will be briefly described. In the normal braking mode, as a control signal from the ABS computer 10b is not sent to the actuator 34, the fluid pressure corresponding to the displacement of the brake pedal 30 is exerted to the respective wheel cylinders 36, 38, 40, 42 provided in the wheels 12, 14, 16, 18.

In the pressure-decreasing mode selected upon detection of a sharp rise in the slipping degree of the wheel, the hydraulic pressure of any one of the wheel cylinders 36, 38, 40, 42 corresponding to the slipping wheel is decreased at a constant rate. In the pressure-keeping mode kept until the slip state of the wheel is recovered, the hydraulic pressure of any one of the wheel cylinders 36, 38, 40, 42 corresponding to the slipping wheel is kept to be lower than a level corresponding to a displacement of the brake pedal 30, by a predetermined pressure-decreasing amount.

In the pressure-increasing mode selected upon determination that the wheel has stopped slipping, the hydraulic pressure of any one of the wheel cylinders 36, 38, 40, 42 corresponding to the wheel that has stopped slipping is kept higher than the level established in the holding mode by a predetermined pressure increase amount in accordance with the displacement of the brake pedal 30. The ABS control is executed by selecting an appropriate one of the aforementioned modes so as to allow safe and quick braking during vehicle operation.

The TC computer 10c detects racing of the driving wheel using the information received from the signal input portion 10a, and the information representing the engine speed of the internal combustion engine (not shown). As a result, the racing of the driving wheel can be effectively prevented by controlling the throttle valve of the engine, and operation of the actuator 34.

The VSC computer 10d detects a possibility of spin or drift of the vehicle during cornering using the information received from the signal input portion 10a or the yaw rate sensor 11, and holds the vehicle in a stable state by controlling the operation of the actuator 34 and the like.

In the operation of the ECU 10 as described above, the signal input portion 10a accurately detects the wheel rotating speed and the wheel rotating direction of the respective wheels 12, 14, 16, 18. Therefore, the ABS control, TC control, and VSC control can be appropriately performed by the respective computers 10b, 10c, 10d. If the calculated result of the wheel rotating speed becomes equal to or greater than a predetermined value, the change in the output of the rotating direction is inhibited. Therefore, an error in the result of detection of the rotation detecting device owing to such factors as the external magnetic field may not occur in any of the wheels 12, 14, 16, 18 during forward or reverse rotating operation. The operating failure in various devices installed in the vehicle, thus, may reliably be prevented.

Although the invention has been described on the basis of the preferred embodiment, it is understood that the invention is not limited to the foregoing embodiment. In the embodiment, the ECU 10 is functionally divided into the signal input portion 10a, ABS computer 10b, TC computer 10c and VSC computer 10d. However, it is also possible to combine those functions into a single computing device.

In the rotating state detecting device of the invention, if the wheel rotating speed is equal to or greater than a predetermined value, a change in the output representing the rotating direction is inhibited. Therefore, output failure of the rotating direction can be prevented, resulting in accurate operation of the on-board system.

While the invention has been described with reference to preferred embodiments thereof, it is to be understood that the invention is not limited to the preferred embodiments or constructions. To the contrary, the invention is intended to cover various modifications and equivalent arrangements. In addition, while various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicle wheel rotation detecting system, comprising:
   a rotating member that rotates together with a vehicle wheel;
   a detected portion, that is provided in the rotating member;
   a first detector that generates a signal in response to a passage of the detected portion; and
   a second detector that detects a rotating direction of the vehicle wheel in accordance with an output of the first detector, the rotating direction being adapted to be used by an on-board system; wherein
   when a rotating speed of the vehicle wheel is equal to or greater than a predetermined value, a change in an output of the rotating direction is inhibited.

2. The vehicle wheel rotation detecting system according to claim 1, wherein the detected portion is at least one protrusion comprising a magnetic material.

3. The vehicle wheel rotation detecting system according to claim 2, wherein a plurality of protrusions of said at least one protrusion are formed at predetermined intervals on an outer periphery of the rotating member.

4. The vehicle wheel rotation detecting system according to claim 1, wherein the first detector comprises a pair of elements, and the second detector detects the rotating direction of the vehicle wheel on the basis of a difference in phases of pulse signals output from the pair of elements.

5. The vehicle wheel rotation detecting system according to claim 4, wherein the pair of elements comprise a semiconductor magnetic sensor.

6. The vehicle wheel rotation detecting system according to claim 1, further comprising a rotating speed detector that detects a rotating speed of the vehicle wheel on the basis of an interval of pulses of the signal generated from the first detector.

7. A vehicle wheel rotation detecting method comprising the steps of:

obtaining information of a rotating direction of a vehicle wheel on the basis of a signal generated by a detector in response to a passage of a detected portion, the detected portion mounted on a rotating member that rotates together with the vehicle wheel; and calculating a rotating speed of the vehicle wheel on the basis of the detected signal; wherein when the rotating speed is equal to or greater than a predetermined value, a change in an output of the rotating direction is made invalid, and a previously detected rotating direction is maintained.

8. A vehicle wheel rotation detecting method according to claim 7, wherein the rotating direction of the vehicle wheel is detected on the basis of a difference in phases of pulse signals output from a pair of elements that comprise the detector.

9. A vehicle wheel rotation detecting method according to claim 7, wherein the rotating speed of the vehicle wheel is detected on the basis of an interval of pulses of the signal generated from the detector.

* * * * *